(12) United States Patent
Whale et al.

(10) Patent No.: US 10,563,048 B2
(45) Date of Patent: Feb. 18, 2020

(54) COMPOSITIONS COMPRISING PARENCHYMAL CELLULOSE PARTICULATE MATERIAL

(71) Applicant: CELLUCOMP LIMITED, Fife (GB)

(72) Inventors: Eric Whale, Fife (GB); David Hepworth, Fife (GB)

(73) Assignee: CELLUCOMP LIMITED, Fife (GB)

( * ) Notice: Subject to any disclaimer, the term of this patent is extended or adjusted under 35 U.S.C. 154(b) by 81 days.

(21) Appl. No.: 15/322,403

(22) PCT Filed: Jun. 26, 2015

(86) PCT No.: PCT/GB2015/051878
§ 371 (c)(1),
(2) Date: Dec. 27, 2016

(87) PCT Pub. No.: WO2016/001635
PCT Pub. Date: Jan. 7, 2016

(65) Prior Publication Data
US 2018/0208748 A1    Jul. 26, 2018

(30) Foreign Application Priority Data

Jun. 30, 2014    (GB) .................................... 1411637

(51) Int. Cl.
*C08L 1/02* (2006.01)
*C09K 8/20* (2006.01)
*D21C 1/08* (2006.01)

(52) U.S. Cl.
CPC ............... *C08L 1/02* (2013.01); *C09K 8/206* (2013.01); *D21C 1/08* (2013.01)

(58) Field of Classification Search
None
See application file for complete search history.

(56) References Cited

U.S. PATENT DOCUMENTS

| 5,137,744 A | 8/1992 | Cagley et al. ................ 426/615 |
| 5,179,076 A | 1/1993 | Elward-Berry ............... 507/112 |

(Continued)

FOREIGN PATENT DOCUMENTS

| EP | 1 707 577 A2 | 4/2006 | ............. C08B 15/02 |
| EP | 1 707 669 A2 | 4/2006 | ............... D21C 9/00 |

(Continued)

OTHER PUBLICATIONS

International Preliminary Report on Patentability (ISR) dated Jan. 3, 2017 in PCT/GB2015/051878, published as WO 2016/001635.

(Continued)

*Primary Examiner* — Jeffrey D Washville
(74) *Attorney, Agent, or Firm* — Harness, Dickey & Pierce, P.L.C.

(57) ABSTRACT

The invention relates to a composition comprising a plant-derived cellulose particulate material comprising less than 30 wt % extractable glucose; and extractable xylose in an amount of at least 3% of the amount of extractable xylose in the starting plant material, and an agent selected from the group comprising natural ionic polymers or natural non-ionic polymers; synthetic water dispersible polymers, and/or associative thickeners, and its various uses, including as a drilling fluid.

20 Claims, 4 Drawing Sheets

(56) References Cited

U.S. PATENT DOCUMENTS

| | | | | |
|---|---|---|---|---|
| 5,964,983 A | * | 10/1999 | Dinand | C09K 8/206 |
| | | | | 162/187 |
| 10,093,748 B2 | * | 10/2018 | Nelson | C08B 15/08 |
| 2006/0289132 A1 | | 12/2006 | Heijnesson-Hulten | 162/70 |

FOREIGN PATENT DOCUMENTS

| | | | | |
|---|---|---|---|---|
| WO | WO 00/50463 | 8/2000 | | C08B 15/02 |
| WO | WO 2014/147392 | 9/2014 | | C08H 8/00 |
| WO | WO 2014/147393 | 9/2014 | | C08H 8/00 |

OTHER PUBLICATIONS

International Search Report (ISR) dated Sep. 9, 2015 in PCT/GB2015/051878, published as WO 2016/001635 A1.
Written Opinion (WO) dated Sep. 9, 2015 in PCT/GB2015/051878, published as WO 2016/001635 A1.
Office Action from corresponding Chinese Patent Application No. 201580044277.7, dated Dec. 14, 2018.

* cited by examiner

COMPOSITIONS COMPRISING PARENCHYMAL CELLULOSE PARTICULATE MATERIAL

CROSS-REFERENCE TO RELATED APPLICATIONS

This application is a national phase application of PCT Application No. PCT/GB2015/051878, filed on 26 Jun. 2015, which claims benefit of GB 1411637.0, filed 30 Jun. 2014. The entire disclosure of the applications identified in this paragraph are incorporated herein by reference.

FIELD OF THE INVENTION

The present invention relates to compositions comprising parenchymal cellulose-containing particles derived from plant material and their use as viscosity modifiers for various compositions.

BACKGROUND TO THE INVENTION

Cellulose forms the basic structural component of plant cell walls where it exists in the form of cellulose fibres. The use of cellulose extracted from plant material attracts interest because, generally, the cellulose has good strength, stiffness, biodegradability and renewability properties. It is known to reinforce materials such as plastics materials and epoxy resins, with coarse plant fibres from hemp and flax, for example. It is known to use chemically modified cellulose, such as hydroxyethyl cellulose, to increase the viscosity of an aqueous medium such as an emulsion.

However, the production of such chemically modified cellulose is energy intensive, involving a number of treatment steps.

Cellulose fibres can be broken down to the substructures of microfibrils and nanofibrils. The use of these highly purified cellulose substructures as additives for modifying the physical properties of dispersions for various uses has attracted interest in recent years. In particular, it is known that some microfibrilar and nanofibrilar cellulose compositions can have a high viscosity in water. Such high viscosity compositions could be useful as viscosity modifiers, for instance in drilling muds. For instance U.S. Pat. No. 5,964,983, EP-A-0134084, U.S. Pat. No. 5,179,076, and WO-A-2014017911 disclose drilling fluid compositions comprising cellulose based particles. However, these fluids tend to show stability issues, and are also not showing any filter cake formation characteristics. Similarly in other applications such as paints or composites, the coagulation is undesired, since it may render the compositions unsuitable for application.

The present invention seeks to provide a new compositions comprising producing cellulose-containing material from plant matter which alleviates one or more of the above problems, and uses for same.

SUMMARY OF THE INVENTION

The present invention relates to compositions of treated parenchymal cellulosic particles. These were found of particular value for such diverse uses as drilling fluids showing filter cake formation characteristics when used in combination with an agent selected from natural ionic polymers or natural non-ionic polymers; synthetic water dispersible polymers, and/or associative thickeners, or as paint formulations, and for the control of flocculation of aggregate inorganic particles such as titanium dioxide or calcium carbonate.

Applicants found that surprisingly, the use of a plant-derived cellulose-containing particulate material synergistically enhanced the shear thinning behaviour of the suspensions according to the invention, while also permitting to control flocculation of particles.

According to a first aspect of the invention there is provided a composition comprising a plant-derived cellulose particulate material comprising less than 30 wt % extractable glucose; and extractable xylose in an amount of at least 3% of the amount of extractable xylose in the starting plant material, and an agent selected from the group comprising polyelectrolytes, in particular natural ionic polymers or natural non-ionic polymers; synthetic water dispersible polymers, and/or associative thickeners.

According to a second aspect of the invention there is provided a process for preparing a composition according to any one of claims 1 to 6, the process comprising the steps of:
 (i) contacting herbaceous plant material comprising greater than 30% by volume of parenchymal cell material and less than 10 wt % lignocelluloses with a peroxide reagent and water;
 (ii) heating the mixture from (i) to a temperature of from 30 to 110° C. and maintaining said mixture at a temperature of from 30 to 110° C. until the pH of the mixture has dropped by at least 2 pH units;
 (iii) isolating the cellulose-containing particles, and
 (iv) contacting the cellulose-containing particles with an agent selected from the group comprising natural ionic polymers or natural non-ionic polymers; synthetic water dispersible polymers, and/or associative thickeners, or a combination thereof.

Advantageously, in the second aspect of the invention, the use of a peroxide reagent to treat plant material has been found to be extremely effective in producing the cellulose-containing particles of the first aspect and, in particular, low to medium viscosity cellulose-containing particles. The process of the invention employs the use of only one chemical reagent to break down the vegetable material, the peroxide reagent, and thus is a relatively simple, efficient process. Further, the process of the invention can be controlled relatively easily to produce cellulose-containing particles having a relatively low viscosity in water. In particular, the viscosity of the cellulose-containing particles can be controlled by monitoring the pH of the reaction mixture of step (ii). Also the process of the invention can be controlled to provide decolourised cellulose-containing particles without having to use any additional chemical/biological reagents.

A third aspect of the invention relates to the compositions obtainable by the process of the invention.

In the process of the invention the plant material is broken down to particles comprising plant cell wall material. These particles comprise plant cell wall material, retain some of the character of the plant cell walls and, importantly, have the ability to swell with water. The particles have good water-holding capabilities and this property contributes to their usefulness as viscosity modifiers in water-based systems as diverse as drilling mud and coatings. The compositions have in particular been shown to have a high stability and good mechanical properties, such as strength, and can beneficially reduce the porosity of paper compositions.

Further aspects of the invention relate to the use of the compositions comprising the cellulose-containing particles, and are set out in the claims.

DETAILED DESCRIPTION OF THE INVENTION

Figure 1:
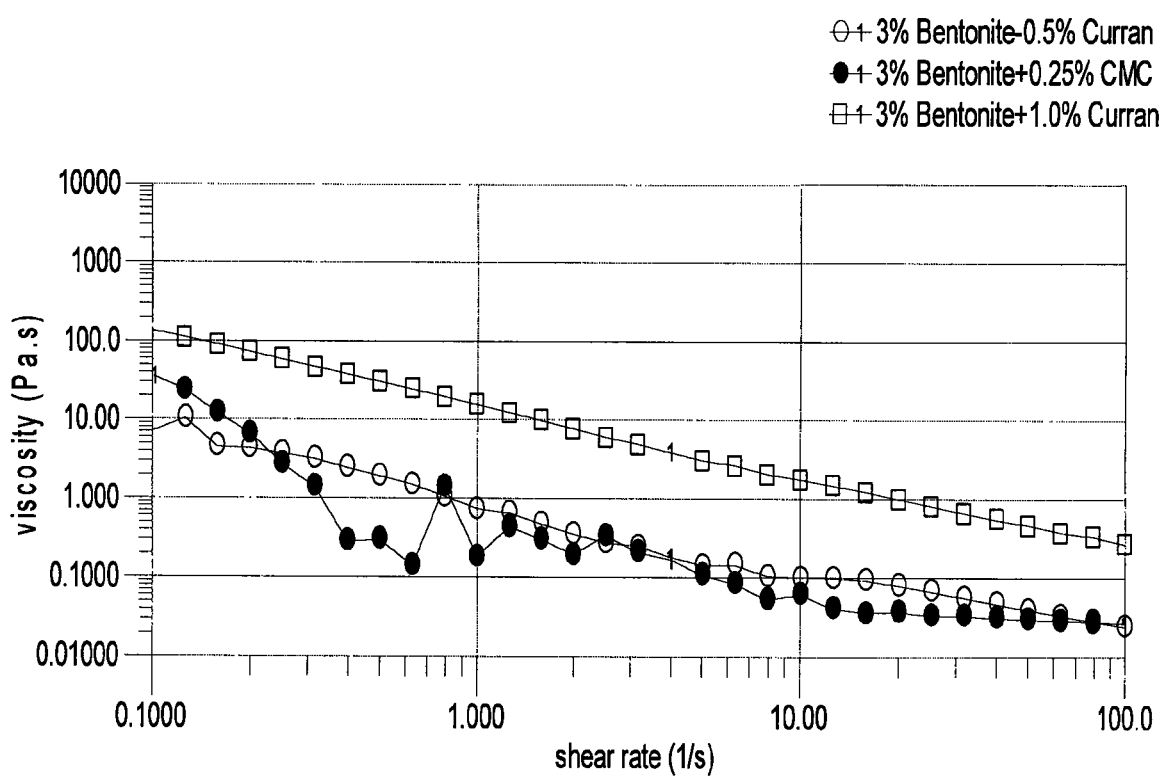
FIGS. 1 and 3 show the comparison of thickening effects of the present compositions comprising plant derived cellulosic particular matter (referred to as Curran), and carboxymethyl cellulose in 3% bentonite suspension at 20° C.

Unless otherwise stated, references herein to cellulose-containing particles and cellulose particulate material should be interpreted as any cellulose containing material resulting from the processes described herein. Such references should not be interpreted as excluding any other materials, rather that the particles contain or comprise cellulose.

Unless otherwise stated, references herein to extractable content of a monosaccharide other than glucose refer to the amount of the stated monosaccharide which can be extracted through hydrolysis of an alcohol insoluble fraction of cellulose-containing particles or cellulose particulate material when contacted with 2M trifluoroacetic acid for 4 hours at least 100° C.

Unless otherwise stated, references herein to extractable content of glucose refer to the amount of glucose which can be extracted through hydrolysis of an alcohol insoluble fraction of cellulose-containing particles or cellulose particulate material when contacted with 72% (w/v) sulphuric acid for 4 hours at 120° C.

Unless otherwise stated, wt % values refer to the extractable amount of the specified compound isolated from a known dry mass of the particulate material following acid hydrolysis.

Unless otherwise stated, absolute % values refer to the extractable amount of the specified compound isolated from the particulate material following acid hydrolysis as a percentage of the extractable amount of the specified compound isolated from the starting plant material following acid hydrolysis. Unless otherwise stated, references herein to the starting plant material are to the herbaceous plant material used in the process of the present invention. References to the starting plant material are also to plant material which has been homogenized to a pulp but before any chemical treatment.

Unless otherwise stated, references herein to the "peroxide process" are to the treatment of the plant material with a peroxide reagent with the application of heat.

Unless otherwise stated, references herein to the "peroxide plus oxidant/bleach process" or the "full process" are to the treatment of the plant material with a peroxide reagent followed by treatment with an oxidant/bleach.

Unless otherwise stated, references herein to the viscosity of the cellulose-containing particles is the viscosity the particles at a concentration of 1% dry weight in water as measured at 20° C. using a Brookfield viscometer with RV spindles rotated at 10 rpm.

Unless otherwise stated, references herein to "high viscosity" cellulose-containing particles are to those particles having a viscosity of greater than about 2500 cps when measured according the method described above.

Unless otherwise stated, references herein to "low viscosity" cellulose-containing particles are to those particles having a viscosity of less than about 2000 cps, for example less than about 1000 cps, when measured according the method described above.

Unless otherwise stated, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

Unless otherwise stated herein, the second component of the composition other than the cellulose-containing particles have the following properties in common:

1) they are hydrophilic, or partially hydrophilic, or dispersible in water;
2) they are able to form long chain conformations, or comprise groups that can form long chain conformations, rather than coiled conformations when dissolved/dispersed in water;
3) they are capable of forming polymer networks in water by interacting with other polymer units of same or different species; whereby interactions include hydrogen bonding, ionic interactions, hydrophobic interactions; and
4) they have an average Molecular weight ($M_w$) of at least 400.

Unless otherwise stated herein, the terms "natural ionic polymers" or "or natural non-ionic polymers" refers to naturally occurring thickening agents and slightly modified naturally occurring thickening agents, including but not limited to modified celluloses such as hydroxyethyl cellulose (HEC) and carboxymethyl cellulose (CMC), and polysaccharides such as xanthan gum, alginate, guar gum, carrageenan, gum Arabic, gum ghatti, karaya, tragacanth, pectin, starch, locust bean gum, scleroglucan, tamarind and derivatives thereof, and starches. The xanthan may be an unmodified xanthan gum, non-acetylated xanthan gum, non-pyruvylated xanthan gum or non-acetylated-non-pyruvylated xanthan gum.

Xanthan and Guar gum are widely available raw materials that requires little processing and therefore represent one of the preferred options in the field. When required, guar gum can be cross-linked with Borate, Titanate, and Zirconate through the cis hydroxyl groups present on the mannose backbone of the polymer. Delayed cross-linkers, as well as polymer stabilizers or suspended water-insoluble, meltable or degradable polymers find common use in guar based fracturing fluid formulations.

Natural ionic polymers and natural non-ionic polymers are polymeric materials and may be partially or fully water soluble. They are selected to enhance the compositions rheological properties, e.g. to increase the composition's viscosity and surface tension without substantially interfering with the composition's ability to stabilise aggregate additives. Exemplary natural polymers include polysaccharides, such as xanthan gum, guar gum, modified starches and the like; modified celluloses, such as hydroxyethyl cellulose (HEC), carboxymethyl cellulose (CMC), as well as their soluble salts, polyacrylamides, and polyvinyl alcohols. The exemplary natural polymers may have a weight average molecular weight ($M_w$) typically from 100,000 to 2,000,000 g/mol, such as e.g. 200,000 to 1,000,000 g/mol, preferably of from 120.000 to 2750.000 g/mol.

Unless otherwise stated herein, the term "synthetic water dispersible polymers" refers to synthetically prepared polymers, through e.g. condensation reactions such as polyesters, polyethers or polyurethanes, and/or through radical polymerisation such as acrylic or styrene acrylic polymers that are water dispersible.

The water-dispersability may be achieved through the polarity of the polymers as such, or preferably through neutralisation of suitable substituents in the polymer chain or backbone, e.g. neutralised polyacrylates; however the latter preferably are employed with a suitable associative thickener.

The polymers or agents above are typically added to the cellulose-containing particle composition after its dispersion in water or alternatively may be added separately and approximately simultaneously with the other components of the composition.

The concentration of the polymers in the composition may depend in part on the concentration of the other binder components in the composition. The carbohydrate binder compositions may be aqueous mixtures or solutions, and their viscosities depend in part on the how much the polymer precursors have been diluted by the water. For example, some concentrated binder compositions (e.g., solids concentrations of 45 to 70 wt. % or more) may have viscosities in the hundreds of centipoise at room temperature. The concentrated resins are typically diluted with water to, for example, a solids concentration of 10 to 30 wt. % solids (e.g., 10 to 20 wt. % solids), reducing the binder composition's viscosity to less than 3 cPs at room temperature. Other binder compositions may have functional viscosities at high concentrations (e.g., 20 cPs at 50 wt. % solids concentration) but should be diluted to address processing challenges such as LOI, weight, and uniformity problems for the applied binder composition. Addition of the polymers may increase the viscosity of the aqueous composition. The concentration range of the polymers depends on the type of agent used. For example, adding hydroxyethyl cellulose to a concentration range of 0.05 to 0.3 wt. % may be sufficient to increase the composition's viscosity to a desired value, while the same viscosity range may be met by adding 0.03 wt. % to 0.2 wt. % xanthan gum to the aqueous composition. In addition to the polymers, the composition may also contain surfactant added in amounts to achieve a surface tension for the composition of 35 to 50 mN/m. These surfactants may include cationic, anionic, and/or non-ionic surfactants.

Unless otherwise stated herein, the term "associative thickeners" refers to HASE polymers, i.e. hydrophobically modified alkali swellable emulsions, which are partly ionic partly hydrophobic polymers; and/or b) HEUR polymers, i.e. hydrophobically modified ethoxylated urethane. These are non ionic polymers e.g polymers with hydrophobic ends and long intermediate chains.

A HASE polymer preferably is a polymer synthesized using a specialized associative monomer that contains C1-C4 alkyl, propylene oxide, ethylene oxide and a polymerizable group, resulting in a alkali-swellable and alkali soluble associative polymer.

Preferably, the HASE polymer is the polymerization product of a monomer mixture comprising: (a) at least one acidic vinyl monomer; (b) at least one nonionic vinyl monomer; (c) a first associative monomer having a first hydrophobic end group; (d) a monomer selected from the group consisting of a second associative monomer having a second hydrophobic end, a semihydrophobic monomer and a combination thereof; (e) one or more crosslinking monomers or chain transfer agents. When monomer (d) is an associative monomer, the first and second hydrophobic end groups of monomers (c) and (d) preferably have significantly different hydrophobic and/or steric character from one another.

The term "HEUR" polymer refers to a Hydrophobically modified alkylene oxide urethane polymer, which includes ethylene oxide urethane polymers modified with hydrophobes that contain organic bases such as secondary or tertiary amines (amine-modified HEURs), the presence of which provides for viscosity control through a pH trigger.

When the pH of the HEUR composition is sufficiently low with respect to the pKa of the incorporated base, the basic groups are protonated and the viscosity is relatively low; when the pH is sufficiently high, associative thickening occurs. Thus, incorporation of basic hydrophobes into the HEUR polymer allows relatively high concentration of polymer to be dissolved in water at low pH; once the solution is added to the high pH environment of paint coatings, the base is deprotonated and the associative thickening mechanism activated.

Cellulose-containing particles: The first aspect of the present invention provides a composition comprising a plant-derived cellulose particulate material comprising less than 30 wt % extractable glucose; and extractable xylose in an amount of at least 3% of the amount of extractable xylose in the starting plant material. In the process of the invention, the plant material is broken down to cellulose-containing particles comprising plant cell wall material. Plant cell wall material comprises cellulose, hemicelluloses (such as xyloglucans, xylans, mannans and glucomannans), pectins, and proteins such as glycoproteins. The particles can include plant cells, plant cell walls and loose associations of plant cell wall polymeric components, which can be, for example, pieces of a gel formed from cellulose, hemicellulose, pectin and protein. It is believed that, in the process of the invention, plant cell wall breakdown occurs through partial degradation of pectins and hemicelluloses and subsequent extraction of pectinic and hemicellulosic monosaccharides. However, it is believed that the process of the present invention does not degrade the cellulosic material such that some of the cell wall character/structure is retained. It is also believed that the peroxide reagent cleaves covalent bonds within the cell wall polysaccharide structure, loosening up the cell wall structure, with a result that the cellulose-containing particles of the invention are capable of swelling with water. This ability to swell with water contributes to the advantageous rheology-modifying properties that the particles of the present invention exhibit.

The cellulose-containing particles are insoluble in water. By insoluble in water is meant that, at a concentration of 1 wt % (solids) or less in water, the cellulose-containing particles are discrete particles. A discrete particle is one that can be observed as such using light microscopy at 100× magnification. The cellulose-containing particles preferably have a mean major dimension of from 1 to 250 μm. The particles can have a mean major dimension which is greater than 10 μm and up to 200 μm. Preferably they have a mean major dimension of from 10 to 70 μm or from 30 to 70 μm. The mean major dimension can be measured by light microscopy. The particles are stained by adding a few drops of methylene blue to a dilute suspension of fully hydrated particles on a slide. The particles are viewed at 100× magnification, using a Dyno-eye camera (USB) on the eye piece of the microscope with Dynocapture 2.0 software on a computer connected to the camera. The largest particle dimension is measured using image analysis, the accurateness of which was confirmed by analysis using a data from Malvern Mateziser 2000, showing that the [d,4,3] volume weighted average is same as the figures derived from the above optical analysis.

Preferably the cellulose-containing particles contain less than 5 wt %, preferably less than 3 wt %, of microfibrillar material as measured by the amount of material that passes through a 10 μm filter after repeated washing followed by drying of the washings at 150° C.

The cellulose-containing particles preferably comprise cellulose in an amount of less than 60 wt %, preferably up to 59 wt %, more preferably up to 55 wt %. Preferably the cellulose-containing particles contain cellulose in an amount of at least 40 wt % or 45 wt %. In one embodiment, the cellulose-containing particles comprise cellulose in an amount of 50 to less than 60 wt % or in an amount of less 53 to 58 wt %.

In one embodiment, the cellulose-containing particles comprise cellulose in an amount less than about 60 wt %, for example less than about 59 wt %, less than about 58 wt %, less than about 55 wt %, less than about 53 wt %, less than about 50 wt %, less than about 45 wt %, less than about 40 wt %.

In one embodiment, the cellulose-containing particles comprise cellulose in an amount greater than about 40 wt %, for example greater than about 45 wt %, greater than about 50 wt %, greater than about 53 wt %, greater than about 55 wt %, greater than about 58 wt %, greater than about 59 wt %, for example up to about 60 wt %.

Preferably the cellulose-containing particles contain polysaccharides other than cellulose in an amount of from 4 to 6 wt %. Preferably the cellulose-containing particles contain hemicellulose in an amount of less than 2 wt % and the pectin in amount of less than 10 wt %.

The cellulose content and the content of the other polysaccharides may be measured using the following standard method: a sample of the material is converted into alcohol-insoluble residues and a portion of this is then subjected to acid hydrolysis using 2M trifluoroacetic acid for 1 hour at 120° C. This produces a hydrolysate and a non-hydrolysable cellulosic/polysaccharide residue. The hydrolysate is dried and re-suspended in distilled water. This solution is then analysed for monosaccharide content using HPLC.

The cellulose particulate material contains extractable xylose in an amount of at least 3 wt %, for example at least 5% of the amount of extractable xylose in the starting plant material. Alternatively, the cellulose particulate material contains at least 10% of the amount of extractable xylose in the starting plant material, for example at least 20%, at least 30%, at least 40% extractable xylose of the amount of extractable xylose in the starting plant material.

Alternatively, the cellulose particulate material contains at least 3 wt %, for example at least 5% extractable xylose relative to the amount of extractable xylose in the starting plant material. Alternatively, the cellulose particulate material contains at least 10% extractable xylose relative to the amount of extractable xylose in the starting plant material, for example at least 20%, at least 30%, at least 40% extractable xylose relative to the amount of extractable xylose in the starting plant material.

Alternatively, the cellulose particulate material contains extractable xylose in an amount of at least 4% of the amount of extractable xylose in the starting plant material. Alternatively, the cellulose particulate material contains at least 5% of the amount of extractable xylose in the starting plant material, for example at least 6%, at least 7%, at least 8%, at least 9% extractable xylose of the amount of extractable xylose in the starting plant material.

Alternatively, the cellulose particulate material contains extractable xylose in an amount of less than 10% of the amount of extractable xylose in the starting plant material. Alternatively, the cellulose particulate material contains less than 9% of the amount of extractable xylose in the starting plant material, for example less than 8%, less than 7%, less than 6%, less than 5%, less than 4% extractable xylose of the amount of extractable xylose in the starting plant material.

Alternatively, the cellulose particulate material contains less than 70% extractable xylose relative to the amount of extractable xylose in the starting plant material. Alternatively, the cellulose particulate material contains less than 60% extractable xylose relative to the amount of extractable xylose in the starting plant material, for example less than 55% extractable xylose relative to the amount of extractable xylose in the starting plant material.

In an alternative embodiment, the cellulose particulate material is derived from sugar beet and contains at least about 0.5 wt %, for example at least about 1 wt %, at least about 1.5 wt %, for example at least about 1.6 wt %, at least about 1.7 wt %, at least about 1.8 wt % at least about 1.9 wt %, for example about 2 wt % extractable xylose.

In an alternative embodiment, the cellulose particulate material is derived from sugar beet and contains at least about 0.5 wt %, for example at least about 1 wt %, at least about 1.5 wt %, for example at least about 1.6 wt %, at least about 1.7 wt %, at least about 1.8 wt % at least about 1.9 wt %, for example about 2 wt % extractable xylose when the amount of extractable xylose in the starting sugar beet plant material is about 20 wt %.

In an alternative embodiment, the cellulose particulate material is derived from carrot and contains at least about 0.8 wt %, for example at least about 0.9 wt %, for example about 1.0 wt % extractable xylose when the amount of extractable xylose in the starting carrot plant material is about 2.0 wt %.

The cellulose particulate material contains less than 30 wt % extractable glucose. Alternatively, the cellulose particulate material contains less than 25 wt % extractable glucose, for example less than 20 wt %, less than 19 wt %, less than 18 wt %, less than 17 wt %, less than 16 wt %, less than 15 wt % extractable glucose.

In an alternative embodiment, the cellulose particulate material is derived from sugar beet and contains less than about 25 wt %, for example less than about 20 wt %, less than about 15 wt %, for example about 13 wt % extractable glucose when the amount of extractable glucose in the starting sugar beet plant material is about 7 wt %.

In an alternative embodiment, the cellulose particulate material is derived from carrot and contains less than about 25 wt %, for example less than about 20 wt %, for example about 19 wt % extractable glucose when the amount of extractable glucose in the starting carrot plant material is about 11 wt %.

In one embodiment, the cellulose particulate material contains less than about 1 wt %, for example less than about 0.5 wt %, for example less than about 0.2 wt %, for example substantially no mannose. In one embodiment, the cellulose particulate material contains less than about 1 wt %, for example less than about 0.5 wt %, for example less than about 0.2 wt %, for example substantially no rhamnose.

In one embodiment, the cellulose particulate material may comprise one or more polysaccharides from homogalacturonan, (1-4)-β-D-galactan, xyloglucan, (1-4)-β-D-xylan and (1-4)-β-D-arabinoxylan. In one embodiment, the cellulose particulate material may comprise fully methylesterified homogalacturonan, partially methylesterified homogalacturonan or fully de-esterified homogalacturonan. In one embodiment the cellulose particulate material may comprise one or more glycoproteins. For example, in one embodiment the cellulose particulate material may comprise extensin. Determination of the presence of such components can be readily carried out using the CoMPP glycoarray method as described in Møller I, Marcus S E, Haeger A, Verhertbruggen Y, Verhoef R, Schols H, Ulvskov P, Mikkelsen J D, Knox J P, Willats W. (2007) High-throughput screening of monoclonal antibodies against plant cell wall glycans by hierarchical clustering of their carbohydrate microarray binding profiles. Glycoconj J. 25(1): 37-48.

The cellulose-containing particles preferably comprise a non-saccharide (i.e. non-carbohydrate) component which is present in an amount of 20 to 50, preferably 35 to 48 wt %. This component may comprise proteins, e.g. glycoproteins.

The cellulose-containing particles can be hydrated and preferably have water-holding capacities of 90 to 99.5 wt % water. The water-holding capacity is measured by dispersing the particles in water, letting them fully hydrate, then filtering them out using a 10 μm filter paper, with no pressure applied during filtering. The material collected in the filter once the liquid has ceased to drain out is weighed, then dried using a moisture analyser set to 150° C., and then reweighed to determine the amount of water present.

The cellulose-containing particles used in the compositions according to the invention in water-based formulations were found quite insensitive to pH, i.e. the viscosity did not measurably change between a pH of 2 to 14. This is in contrast to many other viscosity-modifying products such as hydroxyethylcellulose (HEC) that are sensitive to pH changes in this range.

The cellulose-containing particles may have a viscosity of up to 2500 cps, for example up to 1000 cps and preferably have a viscosity of at least 10 or at least 100 cps. In this embodiment, the particles can have a water-holding capacity in the range of 93 to 96 wt % water. Preferably, they have a mean major dimension of from 10 to 70 μm or to 100 μm and comprise cellulose in an amount of 45 or 50 to less than 60 wt %. These low viscosity cellulose-containing particles are useful as viscosity improvers for water-based systems where a relatively large amount can be added to achieve a required viscosity whilst adding mechanical strength to the substantially dried and/or cured composite material resulting from the water-based system, or the cellulose-containing particles can have a viscosity of up to 7500 or 8000 cps. They may be high viscosity particles and have a viscosity of from 2500, or 3000 to 7000 cps or they may be low viscosity particles and have a viscosity of from 10 to 1000 cps. The particles may have a viscosity of greater than about 2500 cps, for example at least about 3000 cps, for example at least about 3200 cps, at least about 3500 cps, at least about 4000 cps, at least about 5000 cps, at least about 5500 cps, at least about 6000 cps, at least about 7000 cps, at least about 7500 cps, for example up to 8000 cps. The particles may have a viscosity of less than about 8000 cps, for example less than about 7500 cps, less than about 7000 cps, less than about 6000 cps, less than about 5500 cps, less than about 5000 cps, less than about 4000 cps, less than about 3500 cps, less than about 3200 cps, less than about 3000 cps, for example about 2500 cps.

The particles may have a viscosity of 2500 or 3000 or 4000 cps or more, preferably the particles have a viscosity of 3500 to 5500 cps. In this embodiment, the particles can have a water-holding capacity in the range of 97 to 99.5 wt % water. Preferably, they have a mean major dimension of from 10 to 70 μm or to 100 μm and comprise cellulose in an amount of 45 or 50 to less than 60 wt %. These high viscosity cellulose-containing particles are useful as viscosity improvers for water-based systems as only a relatively small amount is required to achieve a required viscosity. In addition, the viscosity of the system is increased by a large amount at low shear rates and by a lot less at high shear rates. In other words, the cellulose-containing particles were found as very shear-thinning in water-based systems and thus useful as rheology modifiers in such systems. This was found to be particularly advantageous where anti-settlement of heavy additives such as aggregate clay materials is required in a static formulation, e.g. a drilling mud, but where easy flow is required at high shear rates, for example, during application of the mud during drilling or fracking.

Additives/Other Components:

The composition further may comprise: 1) Natural Ionic polymers or natural non-ionic polymers such as but not limited to CMC, Xanthan, Guar, and/or alginate. Without wishing to be bound to any particular theory, it is believed that the viscosity of the cellulose particles increases with increasing molecular weight of the additive, see example when CMC of low molecular weight is employed instead of high molecular weight, possibly due to interaction between the parenchymal cellulose and the polymer networks The composition further may comprise: 2) synthetic water dispersible polymers e.g. high molecular weight water based solid epoxy dispersions.

The composition further may comprise: 3) Associative thickeners. Again, without wishing to be bound to any particular theory, it is believed that these work mainly by associating with hydrophobic materials dispersed in water, such as polymers, for instance acrylics. A polymer network is effectively created which enables interaction with the cellulose containing particles.

The composition may further advantageously comprise one of two different types of these associative thickeners, namely a) HASE polymers, i.e. hydrophobically modified alkali swellable emulsions, which are partly ionic partly hydrophobic polymers; and b) HEUR polymers, i.e. hydrophobically modified ethoxylated urethane. These are non ionic polymers e.g polymers with hydrophobic ends and long intermediate chains.

The composition further may preferably comprise additives that prevent association of the cellulosic particles in the composition, e.g. polymeric dispersants, or additives that provide steric hindrance and prevent any other charged particles being attracted.

The composition further may preferably comprise a balance of polymeric dispersants and polymeric additives selected from the group of natural ionic polymers; synthetic water dispersible polymers, and/or associative thickeners. The correct balance allows simultaneous high viscosity but good dispersion of cellulose containing particles and any other charged particles.

Drilling Fluids

Circulated fluids for use in the drilling of subterranean wells are complex suspensions or fluid emulsions. The purpose of the circulating fluids is manifold in that the fluid serves to cool and lubricate the drilling apparatus, to carry cuttings away from the drill bit to the surface, and to control downhole formation pressures and conditions.

Due to the diversity of geological formations encountered in oil and gas recovery, drilling fluids require frequent maintenance; they are usually custom-blended to provide the specific rheology and other properties required for each situation.

In recent years, the tendency has been towards the drilling of deeper wells. This tendency has increased the demands placed upon drilling fluid performance in that significant formation variation is often encountered in a single well and that the overall temperature range experienced during drilling can become quite high—often exceeding an order of magnitude.

Additionally, the increased depth of certain wells and the tendency for oil and gas to be sought for in regions having substantial geologic pressures, place stringent demands upon drilling fluids. Thus such fluids must increasingly be capable of performing under conditions of high temperature, high density and high salt content.

Non-circulating fluids useful in the recovery of oil and gas are generally employed subsequent to the initial drilling of a recovery well. Such fluids include completion and workover fluids, packing fluids, fracturing fluids, stimulation fluids, water retention agents useful in connection with drilling cement, and other fluids. Each of the foregoing types of non-circulating fluids require certain, well-known properties for good effect. As with circulating fluids, non-circulating fluids are frequently tailor-made or custom-blended to meet the particular requirement of a particular well or geological formation, and each must be capable of utility under increasingly stringent conditions.

Hydraulic fracturing is a term applied to a variety of techniques used to stimulate the production of oil, gas and other fluids from subterranean formations by means of increasing the permeability or conductivity thereof. In hydraulic fracturing, a suitable fracturing fluid is introduced into a subterranean formation through a wellbore under conditions of flow rate and pressure which are at least sufficient to cause the formation to break and to create and extend a fracture into the desired part of the formation. The fracturing fluid carries with it a proppant such as sand, bauxite, or a similar aggregate particulate material, transported into the fracture to create a high permeability path, and to prevent complete closure of the newly opened formation once the pressure gradient is reversed for production. Fracturing fluids must meet the rheological specifications imposed by its required performance, i.e. have a sufficiently high viscosity to create and propagate the fracture through the rock, and to maintain the proppant in suspension as the fracturing fluid flows into the fracture. Very high viscosities are not advisable because an excessive pressure drop can be generated due to friction, which results in unacceptable horsepower pumping requirements. After the pressure is released and the formation has closed on to the newly placed proppant, the ideal fracturing fluid should revert to a low viscosity fluid which can be easily removed from the propped fracture to facilitate a high production rate.

Fluids for the drilling for, or otherwise used in the production of oil and gas and in other well-drilling applications are well-known to those skilled in the art. Moreover, the qualities which are necessary to insure good performance in each of the foregoing fluids are similarly well-known. Further explanation of those properties and of fluids which are useful in the production of oil and gas may be had from a review of the publications, Composition and Properties of Oil Well Drilling Fluids, 4th Ed., G. R. Gray, Gulf Publishing Co., Houston (1980); and Drilling and Drilling Fluids, Developments in Petroleum Science, 11, Chilingarian et al., Elsevier, N.Y. (1981). Ther term "drilling mud" or drilling fluid" herein is intended to encompass all of these specific fluids.

Drilling fluids have to meet multi-functional performance requirements. First of all, the polymeric additives have to be easily metered and mixed in the mud formulation. The fluid has to have low viscosity at the pumping and transfer stage, i.e. at a medium to high shear rate, while nevertheless keeping cuttings suspended and transferable from the drilled point to the surface, thus providing so called yield strength and high viscosity at low shear rate. Besides this, it has to permit to separate the cuttings from the drilling mud at a screening stage. The drilling mud has to easily flow after the stop and start of drilling operation. Accordingly, fluid loss and rheological properties and dynamic filtration are crucial properties for drilling muds.

In addition, drilling mud loss to the formation is another critical issue for several reasons. First of all, drilling fluid loss to the formation is one of the highest costs of the any drilling program. Depending on the severity of losses, costs related to fluid losses can be as high as 10-15% of all associated drilling costs. Secondly, severe losses to the formation might also trigger other problems such as well control issues or differential sticking. In addition, these problems add to the non-productive time (NPT) of drilling operation and increase the overall cost of drilling operation significantly. Applicants found that when using compositions comprising suspensions of the cellulose containing particles with dissolved sodium carboxy methyl cellulose (CMC) or dissolved xanthan gum, from powder were formed, these suspensions stabilised clays such as bentonites, while also allowing to cinrease the viscotiy at lower shear forces in a synergistic and non-linear manner.

Process for Preparing Compositions Comprising Cellulose-Containing Particulate Material Step (i):

Step (i) of the process of the invention comprises contacting herbaceous plant material with a peroxide reagent and water to provide a mixture of plant material, peroxide reagent and water.

Plant Material:

The plant material advantageously used for preparing cellulose-containing particles for use in the composition according to the present invention is herbaceous plant material. "Herbaceous" is a well-defined botanical term that refers to annual, bi-annual or perennial vascular plants. These are further characterized by their aerial stems dying after each growth season. Regrowth in subsequent seasons for bi-annual and perennial species takes place from subterraneous organs, for example stem or root storage organs, tubers. This is in contrast to woody species whose stems resume growth each season and thus form growth rings. The particular property of herbaceous plants of relevance to the present invention is the abundance of primary walls in their tissues. These are in particular found in parenchymal tissues. The skilled person will be aware that no organ from a herbaceous vascular plant is made up entirely of parenchyma or entirely of primary walls, as vascular elements with their secondary walls are invariably also a component of all but the simplest organs. However, it will also be appreciated that plant material made up of polysaccharide rich primary cell walls also occurs in two groups of plants that are not vascular plants: the mosses and the charophycean green algae. "Herbaceous" shall, for the purposes of this invention, also comprise biomass from these groups of plants. The plant material used in the process of the invention therefore includes vegetables, for example root vegetables, and fruit. Examples of root vegetables include carrot, sugar beet (also herein referred to as beet) or turnip, parsnip and swede. Examples of fruit include apples, pears and grapes. The plant material may be from a potato. The plant material can be derived from one type of vegetable, for example, substantially all of the plant material can comprise material from one specific root vegetable, for example, one of carrot, sugar beet, turnip, parsnip and swede. By substantially all is meant that at least 90% by dry weight of the vegetable material. As referred to herein, all weights are dry weight unless otherwise specified. Similarly, substantially all of the plant material can comprise material form one specific fruit, for example, one of apples, pears or grapes. The plant material can be derived from a mixture of type of vegetables and fruit, for example, more than one of carrot, beet or turnip, parsnip, swede, apples, pears, and grapes. Preferably the plant material comprises one of or a mixture of sugar beet and carrot. In one embodiment, the plant material used in the process of the invention is not wood. Preferably, where the fruit or vegetable has a skin that forms greater than 3% of the weight of the fruit or vegetable, the fruit or vegetable has had the skin removed, for example, by peeling.

Preferably the plant material has a parenchymal cell content of higher than 30% by volume, more preferably higher than 35% by volume or higher than 50% by volume and most preferably higher than 70% based on the total volume of the plant material. Parenchymal cell content is determined by image analysis, i.e. cutting a section of the plant, viewing the section in a microscope and measuring the areas of parenchymal tissue. Ideally sections are taken through different parts of the plant or plant organ and these areas can then be converted into a prediction of tissue volumes. Preferably the plant material contains less than 20 wt % lignin, more preferably it contains from 1 to 10 wt % lignin, most preferably it contains from 1 to 5 wt % lignin. Lignin content can be measured by a standard method such as the Klason method. This method uses strong acid treatment to breakdown and dissolve all the plant materials except the lignin. The lignin is defined as the weight of material that cannot be broken down by 72% sulphuric acid.

In one embodiment, the herbaceous plant material comprises less than about 30 wt % lignocellulose. In one embodiment, the herbaceous plant material comprises less than about 20 wt % lignocellulose. In one embodiment, the herbaceous plant material comprises less than about 15 wt % lignocellulose. In one embodiment, the herbaceous plant material comprises less than about 10 wt % lignocellulose, for example less than about 9 wt % lignocellulose, less than about 8 wt % lignocellulose, less than about 7 wt % lignocellulose, less than about 6 wt % lignocelluloses, less than about 5 wt % lignocellulose, less than about 4 wt % lignocellulose, less than about 3 wt % lignocellulose, less than about 2 wt % lignocellulose, less than about 1 wt % lignocellulose. In one embodiment, the herbaceous plant material comprises substantially no lignocellulose.

In one embodiment of the present invention the herbaceous starting material is a seed plant, i.e. belonging to Magnoliaphyta. In a further embodiment the plant is a monocotyledon, more specifically a member of Poales, typically a cereal. The plant material may be a waste product or side-stream from agricultural production. In yet another preferred embodiment the herbaceous plant is a member of eucotyledones, more specifically a crop plant, or a waste product or side-stream from agricultural production. Pulps remaining after production of sugar beet or potato starch are attractive agricultural side streams useful for the present invention. Root crops are in general relevant raw materials. A non-exhaustive list comprises carrot, swede, turnips, parsnips and radish. Pomace from fruit preserve, jam, juice production is another valuable waste product from which cellulose may be recovered by the methods disclosed in the present invention.

The plant material may be raw plant material or raw plant material that has been heat treated and/or mechanically treated, it is preferably washed but is, preferably, otherwise essentially untreated. Preferably, it will not have been treated by any chemical reagents which could act to break it down. Preferably, it will not have been subjected to acid or alkali hydrolysis treatment. Preferably the plant material has been mechanically treated, e.g. chopped/shredded so that it is in the form of particles having a mean major dimension of, for example, less than 10 mm, preferably less than 500 µm, more preferably less than 250 µm, most preferably less than 200 µm. The plant material can be in the form of a pulp, for example, taken from an industrial waste stream. The pulp can be prepared from raw plant matter by washing the raw plant matter, shredding or chopping it, cooking it in water at, for example, 90 to 100° C. until soft and optionally homogenising it to reduce the size of the insoluble particles contained therein. Alternatively, the pulp can be prepared from raw plant matter by washing the raw plant matter, shredding or chopping it, cooking it in water in a pressure cooker until soft and optionally homogenising it to reduce the size of the insoluble particles contained therein. It will be recognised that the cooking temperature in this embodiment can exceed 100° C.

Preferably the insoluble particles of the pulp have a mean major dimension of less than 10 mm, preferably less than 500 µm, preferably less than 250 µm, more preferably less than 200 µm. The pulp can be washed and filtered to remove soluble by-products. In one embodiment, step (i) comprises providing a mixture of plant material, peroxide reagent and water, wherein the plant material is made up of particles having a mean major dimension of less than 500 µm. Step (i) can comprise preparing pulp from raw plant material and adding peroxide reagent and water to it. In another embodiment, step (i) can comprise providing a mixture of raw plant material, peroxide reagent and water and homogenising the mixture until the plant material is made up of particles having a mean major dimension of less than 500 µm.

The speed at which the process of the invention proceeds depends, in part, upon the concentration of the reactants. Preferably, the concentration of the plant material in the mixture of step (i) is kept to a level at which the process can be readily controlled. In one embodiment the mixture of step (i) comprises plant material in a concentration of from 1 to 10 wt % based on the combined amount of water and plant material present. Preferably, this concentration is from 1 to 7 wt %, more preferably from 2 to 5 wt %.

Peroxide Reagent:

The process of the invention utilises a peroxide reagent to break down the plant material and to decolourise it. Preferably the peroxide reagent is chosen from hydrogen peroxide, an organic peroxide or an inorganic peroxide. More preferably the peroxide reagent is hydrogen peroxide or an organic peroxide. Examples of suitable organic peroxides are peroxycarboxylic acids such as peracetic acid and meta-chloroperoxybenzoic acid and organic hydroperoxides such as benzylperoxide. Examples of suitable inorganic peroxides include ionic peroxide salts, e.g. peroxides of the alkali and alkaline earth metals and acid peroxides such as peroxysulfuric acid and peroxyphosphoric acid. Most preferably, the peroxide reagent is hydrogen peroxide. The peroxide reagent is preferably present in an amount of between 5 to 40 wt % based on the dry matter weight of the plant material. In one embodiment the peroxide reagent is present in an amount of between 20 to 35 wt % based on the weight of the plant material. In one embodiment the peroxide is added as 35% aqueous solution and the ratio of peroxide reagent solution to dry solids content of plant material is at least about 0.25:1 (by mass), for example at least about 0.5:1, at least about 0.6:1, at least about 0.7:1, at least about 0.8:1, at least about 0.9:1, for example about 1:1.

In the process of the present invention, it is believed that the peroxide reagent acts to loosen the natural cell wall structure by breaking certain bonds within the complex structure of the cell wall allowing it to hydrate (and swell) more with water and greatly increasing the viscosity of the plant material. This effect, the extent and speed of it, has not been observed using acid or alkali hydrolysis of vegetable material. In addition, it has been found that high viscosity cellulose-containing particles can be obtained efficiently by the process of the present invention, with the use a single chemical treatment step on the plant material. Preferably the process does not comprise any additional chemical treatments and/or any biological, e.g. enzymatic treatments.

A catalyst for catalysing the reaction of the peroxide reagent with the plant material can be added to the mixture of step (i). Examples of catalysts include manganese catalysts. Thus the mixture of step (i) can also comprise a peroxide reagent catalyst. However, in one embodiment, the process of the present invention is carried out in the absence of a catalyst.

Step (ii):

Step (ii) preferably involves heating the mixture provided in step (i). In this step the plant material is broken down by the peroxide reagent and also decolourisation of the cellulose-containing particles can occur.

In step (ii), the mixture is heated to a temperature of from 30 to 110° C., for example 30 and 100° C., and maintained at a temperature of from 30 to 110° C., for example 30 and 100° C. for a period of time. The period of time that the mixture is maintained within this temperature range can be between 1 minute and 6 hours. In one embodiment, the mixture is maintained at a temperature of from 30 to 110° C., for example 30 to 100° C., for less than 6 hours, for example less than 5 hours, less than 4 hours, less than 3 hours, less than 2 hours, for example less than 1 hour. Alternatively, the mixture is maintained at a temperature of from 30 to 110° C., for example 30 to 100° C., for at least 1 hour, for example at least 2 hours, at least 3 hours, at least 4 hours, at least 5 hours, at least 6 hours. In one embodiment, the mixture is kept at a steady temperature within the range of 30 to 110° C., for example 30 to 100° C., for the period of time. In another embodiment, the temperature of the mixture can be varied within the range of 30 to 110° C., for example 30 to 100° C., for the period of time, i.e., increased and/or decreased during this period of time, but still remaining within the range of from 30 to 110° C., for example 30 and 100° C. The choice of temperature(s) and the period of time the mixture is kept at the temperature(s) depend on the desired viscosity of the cellulose-containing particles and, optionally, the desired degree of decolourisation. Preferably the mixture is heated to a temperature of from 70 and 100° C. and maintained at a temperature of from 70 and 100° C. for a period of time as specified above.

Viscosity: The inventors have investigated the viscosity behaviour of the cellulose-containing particles as a function of the pH of the mixture of step (ii) which is being held at a temperature of between 30 to 110° C., for example 30 and 100° C., for a period of time. We refer to FIG. 1 from which it can be seen that for the process carried out in Example 1, the pH of the reaction mixture varies with time and with the viscosity of the cellulose-containing particles. In one embodiment, the period of time the mixture is maintained at a temperature of between 30 to 110° C., for example 30 and 100° C., can be determined by monitoring the pH of the reaction liquid of the reaction mixture of step (ii). The present inventors have found that the pH of the mixture varies as the viscosity of the cellulose-containing particles varies and thus this pH measurement can provide an indicator of the viscosity of the cellulose-containing particles produced. It is believed that, advantageously, this pH-viscosity correlation is independent of the temperature that the mixture of step (ii) is heated to/kept at. Thus the correlation can be applied to reaction systems with different heating regimes. However, the pH-viscosity correlation may vary if the type of plant material changes.

Thus in a preferred embodiment of the present invention, the mixture is maintained at a temperature of between 30 to 110° C., for example 30 and 100° C., until it has a predetermined pH value in order to produce cellulose-containing particles having a desired viscosity. The pH value can be determined by a calibration run carried out under the same conditions.

Disclosed herein is a preferred process for preparing the cellulose-containing particles for use in the composition according to the invention, the process comprising:
(i) providing a mixture of plant material, peroxide reagent and water;
(ii) heating said mixture to a temperature in the range of from 30 to 100° C. and maintaining said mixture at a temperature in the range of from 30 to 100° C. for a period of time in order to break down the plant material; and
(iii) isolating a residue comprising cellulose-containing particles, wherein said process comprises monitoring the pH of the mixture during step (ii) and terminating the maintaining of the mixture at a temperature in the range of from 30 to 100° C. when the mixture reaches a predetermined pH value.

In this embodiment said pH value can be determined from a calibration giving the viscosity in water of the cellulose-containing particles to be expected as a function of pH of the reaction mixture in step (ii). Thus one example of the process comprises performing a calibration whereby the process is carried out several times under the same conditions except that the period of time at which the mixture of step (ii) is maintained at a temperature of from 30 to 110° C., for example 30 to 100° C., is varied.

Each time the reaction mixture is sampled. The pH is first measured and the sample then separated into an insoluble residue containing the cellulose-containing particles and a reaction liquid component. The viscosity in water of the cellulose-containing particles is measured and a correlation between viscosity of the cellulose-containing particles and pH of reaction mixture of step (ii) can thus be obtained.

Preferably, no pH-modifying additives are added to the mixture of step (i) or step (ii) during the process. By pH-modifying is meant adjusts the pH of the mixture by a magnitude of greater than 0.5.

The present studies have involved an investigation into the viscosity behaviour of the cellulose-containing particles formed by the process of the invention as a function of the period of time the mixture of step (ii) is held at a temperature of between 30 to 110° C., for example 30 and 100° C. It has been found that the viscosity of the cellulose-containing particles does not vary linearly with time. Unless otherwise specified, as referred to herein, the viscosity of the cellulose-containing particles is the viscosity the particles at a concentration of 1% dry weight in water as measured at 20° C. using a Brookfield viscometer with RV spindles rotated at 10 rpm.

The mixture may be maintained at a temperature of between 30 to 110° C., for example 30 and 100° C., for a predetermined period of time in order to produce particulate cellulose having a desired viscosity. The length of time can be determined by a calibration run carried out under the same conditions. The calibration may change if the concentration of the starting materials (plant material and peroxide reagent), the type of plant material or the temperature at which the reaction mixture is maintained changes.

Preferably, the cellulose containing particles for use in the present composition are prepared by a process comprising:
(i) providing a mixture of plant material, peroxide reagent and water;
(ii) heating said mixture to a temperature in the range of from 30 to 100° C. and maintaining said mixture at a temperature in the range of from 30 to 100° C. a period of time in order to break down the plant material; and
(iii) isolating a residue comprising cellulose-containing particles,
wherein said period of time is chosen so as to produce cellulose-containing particles having a desired viscosity in water. In this process said period of time can be determined from a calibration which gives the viscosity in water of the cellulose-containing particles to be expected as a function of said period of time. Thus, the process may comprise performing a calibration whereby the process is carried out several times under the same conditions except that the period of time at which the mixture of step (ii) is maintained at temperature of from 30 to 100° C. is varied. Each time the reaction mixture is sampled. The sample is then separated into an insoluble residue containing the cellulose-containing particles and a reaction liquid component. The viscosity in water of the cellulose-containing particles is measured and this is correlated with said period of time.

In the process described herein higher viscosity materials are generally produced in a short reaction time, whilst lower viscosity materials are generally produced in a longer reaction time. This is a surprising finding and, as a result of this, the process to the invention can be controlled to provide cellulose-containing particles with specific viscosity properties.

Advantageously, the process described herein can produce significantly decolourised cellulose-containing particles as the peroxide reagent both breaks down the plant material and decolourises it. However, in the case of producing higher viscosity cellulose material, the reaction time can be relatively short and decolourisation may not have occurred to the maximum or the required extent. It has been found that increasing or decreasing the temperature in a series of controlled steps can help to decolourise the cellulose-containing particles while maintaining high viscosity. Thus in one embodiment, step (ii) may comprise heating the mixture to a temperature of between 90 and 100° C. and maintaining it at this temperature for some time, following by cooling the mixture to a temperature of between 75 and 85° C. and maintaining the mixture at this temperature for the rest of the period of time. Alternatively, step (ii) may comprise heating the mixture to and maintaining it at a temperature of between 75 and 85° C. for a period of time then increasing the temperature to between 90 and 100° C. and holding at this temperature for a period of time until the desired degree of decolourization has been achieved.

To achieve very high viscosity cellulose-containing particles, i.e. particles with a viscosity of 6800 cps or greater, without decolourisation of the particles, the mixture may only need to be heated to a relatively low temperature for a relatively short time. Below 30° C., it is not possible to obtain high viscosity cellulose-containing particles of the invention within a reasonable time frame, i.e. in a time frame of hours rather than days.

To achieve high viscosity cellulose-containing particles, i.e. particles with a viscosity of greater than 2500, for example 3000 cps or greater, with significant decolourisation of the particles and within an acceptable time frame of less than 4 hours and preferably less than 2 hours, preferably the mixture should be heated to a temperature of between 70 to 100° C. More preferably, the temperature is in the range of from 80 to 97° C., even more preferably in the range of 90 to 96° C.

To achieve low viscosity cellulose-containing particles, i.e. particles with a viscosity of less than 2500 cps, for example 1000 cps or less, with significant decolourisation of the particles, preferably the mixture should be heated to a temperature of between 90 to 100° C. and maintained at this temperature for at least 2 hours until the desired viscosity has been reached and maximum decolourisation has occurred.

If the mixture provided in step (i) is already hot, from the cooking of the vegetable material to provide a pulp, then it is possible that not much more additional heating of the mixture is required. If this is the case, then the heating of step (ii) has already been partially or wholly carried out in step (i). The heating step is terminated by cooling the mixture of step (ii). Preferably the mixture is cooled rapidly.

Step (ii) can also comprise a step whereby the mixture is homogenised. This can occur during heating and results in shortening the length of step (ii). Alternatively or additionally homogenisation can take place after heating. If hot peroxide is a problem for any of the equipment being used then the homogenisation can be carried out after the heating stage is completed and the material has been cooled. In one embodiment, the process of the invention involves homogenisation of the mixture of step (ii) either while the mixture is being maintained at temperature or after the mixture has been cooled down or both.

In one embodiment of the process described herein, the 35% aqueous peroxide solution may be added in an amount of 0.5% by weight or less of the weight of the herbaceous plant material (dry content) and the peroxide treatment step carried out until substantially all of the peroxide has been consumed and then terminated. In this embodiment, a particulate cellulose material with a viscosity of at least 2500 cps (at a 1 wt % solids concentration) is obtained.

In one embodiment of the process described herein, the 35% aqueous peroxide solution may be added in a ratio of 0.5 parts peroxide solution or less to 1 part herbaceous plant material (dry content), for example 0.25 parts peroxide solution to 1 part herbaceous plant material (dry content) and the peroxide treatment carried out until substantially all of the peroxide has been consumed and the reaction immediately terminated. In this embodiment, a particulate cellulose material with a viscosity of at least 2500 cps (at a 1 wt % solids concentration) is obtained.

In one embodiment of the preferred process described herein, the conditions for the peroxide treatment step may be continued after substantially all of the peroxide has been consumed. In one embodiment, the reaction may be continued for at least a further 30 minutes, for example at least 40 minutes, or at least 60 minutes. In this embodiment, a particulate cellulose material with a viscosity of less than about 2500 cps, for example less than about 1000 cps (at a 1 wt % solids concentration) is obtained.

Step (iii)

In step (iii) of the preferred process a residue comprising the cellulose-containing particles is isolated. This can be achieved by washing and filtering the product from step (ii). The washing removes any soluble breakdown products from the reaction and any excess peroxide reagent. Excess peroxide in the product of step (ii) can also be removed by the addition of a catalyst. Washing can be achieved using a number of different processes such as centrifuge filtration (continuous or batch), microfiltration, filter pressing or simple gravity driven filtration. The peroxide level and the pH can be checked. The peroxide content should preferably be less than 30 mg/l (as measured using a peroxide indicator stick) and pH should preferably be between 6 and 9. Optionally the material can then be pressed or concentrated to lower the water content, for example to 20-50 wt % solids. This pressed cake can then be re-sized by chopping/grinding to form a powder. This powder is capable of rapid re-dispersion and re-hydration when added to water based systems.

Step (iv)

The preferred process may optionally comprise a further step of contacting the cellulose-containing particles with an oxidant. The oxidant may be sodium hypochlorite. The cellulose-containing particles may be washed with water, and optionally filtered, before being contacted with the oxidant. The washed and filtered cellulose-containing particles may be reconstituted in water prior to being contacted with the oxidant. The oxidant step may be carried out at a temperature of about 60° C. or less. The oxidant may be added in a ratio of about 1 part oxidant to 2 parts solids in aqueous solution. The oxidant may be in the form of a 10% aqueous solution of the active oxidant. The temperature of the oxidant step may be maintained for at least 10 minutes, for example at least 20 minutes, up to about 30 minutes. The resultant cellulose-containing particles may be separated from the oxidant solution and washed with water until free from residual oxidant. Washing can be achieved using a number of different processes such as centrifuge filtration (continuous or batch), microfiltration, filter pressing or simple gravity driven filtration.

Step (v)

The preferred process may optionally comprise a further step of homogenizing the mixture obtained from step (iii) or step (iv). The step of homogenization may take place on the filtered and dried material from step (iii) or step (iv). The step of homogenization may take place on material obtained from step (iii) or step (iv) which has been reconstituted in water. The homogenization may be carried out until a desired particle size is obtained.

Step (vi)

The preferred process may comprise a further step of concentrating the cellulose particulate material or cellulose containing particles obtained to a particular concentration. The material may be concentrated to a level of, for example at least 5 wt % solids, for example at least about 10 wt % solids, at least about 15 wt %, at least about 20 wt %, at least about 25 wt %, for example about 30 wt % solids. At levels of 15 wt % solids and greater, the material is able to be grated, which may be advantageous in some applications. Lower loading levels result in a paste-like consistency, which may be advantageous in other applications.

Step (viii)

In this preferred process step, the cellulose-containing particles are contacted with an agent selected from the group comprising natural ionic polymers or natural non-ionic polymers; synthetic water dispersible polymers, and/or associative thickeners, or a combination thereof. This is preferably performed, under conditions that permit to form the desired suspension or dispersion, e.g. in the presence of water, and under suitable shear and temperatures. Note that this step may be carried out also before step vi, thereby generating a dilute composition according to the invention, which may directly be employed, or concentrated further.

Uses of the Composition

The compositions of the present invention comprising the cellulose-containing particles may be water based. Water-based systems as referred to herein include aqueous solutions, dispersions and emulsions.

Typically in the water-based systems, the cellulose-containing particles of the invention are present in an amount of less than about 10 wt %, less than 5 wt %, for example less than 3 wt %, preferably less than 1 wt %, more preferably 0.05 to 0.2 or 0.5 wt %. The cellulose containing particles of the invention may be present in any of these compositions in an amount of at least 0.05 wt %, at least about 0.2 wt %, at least about 0.5 wt %, at least about 1 wt %, at least about 3 wt %, at least about 5 wt %, at least about 10 wt %. In some embodiments, the cellulose particulate material is incorporated into aqueous compositions in an amount of less than about 2 wt %, for example less than about 1.5 wt %, less than about 1.2 wt %, less than about 1 wt %, less than about 0.5 wt %, less than about 0.4 wt %, less than about 0.3 wt %, less than about 0.25 wt %, less than about 0.2 wt %, less than about 0.1 wt %, less than about 0.05 wt %, less than about 0.04 wt %, less than about 0.03 wt %, less than about 0.02 wt %, for example about 0.01 wt %.

Polymeric Additives

The polymers dispersible in water capable of forming networks to be employed in the composition of the invention are preferably present in an amount of less than about 10 wt %, less than 5 wt %, for example less than 3 wt %, preferably less than 1 wt %, more preferably 0.05 to 0.2 or 0.5 wt %. The polymers dispersible in water capable of forming networks may be present in any of these compositions in an amount of at least 0.05 wt %, at least about 0.2 wt %, at least about 0.5 wt %, at least about 1 wt %, at least about 3 wt %, at least about 5 wt %, at least about 10 wt %. In some embodiments, The polymers dispersible in water capable of forming networks are incorporated into aqueous compositions in an amount of less than about 2 wt %, for example less than about 1.5 wt %, less than about 1.2 wt %, less than about 1 wt %, less than about 0.5 wt %, less than about 0.4 wt %, less than about 0.3 wt %, less than about 0.25 wt %, less than about 0.2 wt %, less than about 0.1 wt %, less than about 0.05 wt %, less than about 0.04 wt %, less than about 0.03 wt %, less than about 0.02 wt %, for example about 0.01 wt %.

The compositions may comprise other additives and fillers known in the art such as anti air entrainment or air release agents, setting retarders, setting accelerators and the like.

The invention is further described, but not limited to, the following illustrative examples.

Example 1

Method for Measuring Viscosity and pH with Reaction Time for Hydrogen Peroxide Treated Root Vegetable Pulp Fresh carrots were peeled, chopped and cooked at 90° C. for 2 hours. The carrots were then homogenised in the cooking liquid, using a Silverson FX homogeniser, to form a pulp with particles less than 500 microns in diameter. The concentration of the pulp was measured, using a moisture analyser, to be 5% solids in water. The batch was then divided into a number of 1 litre samples each contained in a polypropylene bottle with tight fitting lid. These bottles were then placed in to a water bath of hot water regulated to 90° C. The internal temperatures of the bottles were checked periodically. When the temperature reached 90° C., 35% hydrogen peroxide was added to each bottle in a ratio of 1 part 35% peroxide to 1 part carrot solids. The bottles were then left in the water at 90° C. for varying lengths of time. Bottles were taken out of the water bath at intervals and cooled rapidly by placing into a bath of cold water. The pH of the contents was immediately measured using a pH meter. The contents were then poured into a coarse filter made of horticultural frost fleece (pore size approximately 250 microns) and the liquid allowed to drain out. The remaining solids were washed 3 times with clean water. Then the remaining solids were scraped out of the filter and placed into a clean beaker. This pulp was homogenised using a bench top Silverson L5M with a fine slotted collar attached in the head. Homogenisation was carried out for 15 minutes at 8000 rpm. The solids content of the homogenised pulp was then measured using a moisture analyser and adjusted to 1% with fresh water. The temperature at this point was measured as 20° C. The viscosity of the pulp was then measured at a concentration of 1 dry wt % in water using a Brookfield Viscometer DVII+Pro EXTRA, with RV spindle heads, run at 10 rpm. Viscosity was recorded in centipoise (cps). The data from these experiments was then used to plot Viscosity as a function of time and pH as a function of time and this plot in shown in FIG. 1.

Example 2: Preparation of Low Viscosity Cellulose Particulate Material from Sugar Beet 900 g of sugar beet pellets were washed and hydrated by adding them to warm water, with dirty water being drained through a sieve. This sugar beet hydrate is placed in a large bucket in excess water and agitated before being scooped out with a colander and washed with water, to ensure that no stones/grit enter the next stage of processing The washed sugar beet is then cooked for 3 hours at 100° C., before being homogenised using a Silverson FX homogeniser fitted with initially coarse stator screens and moving down to the small holed emulsifier screen (15 min process time for each screen). The solids are measured using an Oxford solids meter and the mixture adjusted to 2% solids by addition of clean water.

The mix is then placed in a 25 litre glass reaction vessel and the dry solids content in the vessel is calculated. Peroxide based on ratio of aqueous peroxide solution (at 35%) to the dry solids of 0.25:1 is added when the mix is heating. The temperature is maintained for 6 hours at 90° C. (once it reaches 90° C.), by which time the pH has dropped from around 5 to 3 or less.

Bleaching is then carried out by re-suspending the washed material in clean water and placing it back in the vessel. Bleaching is performed at 60° C., with a 2:1 bleach (2 parts of bleach solution with 10% active chlorine to 1 part solids, for 30 minutes).

The material is then homogenised for 30 minutes on the fine slotted stator screen of the Silverson FX homogeniser The material is then drained through a filter and pressed between absorbent cloths to desired final solids content.

Resuspension of the solids in water at 1 wt % solids resulted in a viscosity (measured as previously described) of 1500 cps.

Example 3: Analysis of the Cellulose Containing Particles for Use in the Composition Dry material from three stages of the process (start; after peroxide treatment; after sodium hypochlorite treatment) was analysed for extractable monosaccharide/polysaccharide content. The starting plant materials tested were sugar beet and carrot.

The test procedure was carried out according to the standard two-step protocol below, which is based on separation of monosaccharides and oligosaccharides from polysaccharides by boiling the sample in an 80% alcohol solution. Monosaccharides and oligosaccharides are soluble in alcoholic solutions, whereas polysaccharides and fibre are insoluble. The soluble components can be separated from the insoluble components by filtration or centrifugation. The two fractions (soluble and insoluble) can then be dried and weighed to determine their concentrations.

The dried materials can then be used for analysis by HPLC, following acid hydrolysis.
(i) Separation of Alcohol Soluble and Insoluble Components
Materials
    Dry samples
    80% Ethanol
    Compressed Nitrogen
Method For each material sample, 50 mg was extracted three times with 5 ml of 80% ethanol, by boiling the samples in capped glass tubes in 95° C. water bath for 10 min each. After each extraction, the tubes were centrifuged at 5000×g for 5 min, and the supernatants of the three extractions combined for sugar analysis.

The residue and supernatant are oven dried prior to acid hydrolysis. Acid hydrolysis using trifluoroacetic acid degrades pectins, hemicelluloses and highly amorphous regions of cellulose, while acid hydrolysis using 72% (w/v) sulphuric acid degrades all polysaccharides with the exception of highly crystalline regions of cellulose.
(ii) (a) Analysis of Matrix Polysaccharides—Trifluoroacetic Acid Hydrolysis
Materials
    Dry samples
    Screw cap tubes
    2M Trifluororoacetic acid=11.4 g in 50 ml (or 3 ml 99.5% TFA and 17 ml $dH_2O$)
    Compressed Nitrogen
    Monosaccharide standards
        Standard sugar mixture of three monosaccharides (glucose, fructose, xylose). Each sugar is in a 10 mM stock solution (100×). The preparation of the standards is done by pipetting 250, 500, and 750 μl in screw cap vials and evaporating to dryness. Proceed to hydrolysis in the same way as with the samples.
Method
Day 1
    Weigh 5 mg of the alcohol insoluble fraction from step (i) in screw cap tubes
    Dry all the samples and monosaccharide standards (250 μl, 500 μl, 750 μl)
Day 2
    In the fume hood, hydrolyse by adding 0.5 ml 2 M TFA. Flush the vials with dry nitrogen, place the cap, and mix well. Wipe nitrogen nozzle with ethanol tissue between samples to prevent contamination.

Heat the vials at 100° C. for 4 h and mix several times during hydrolysis.

Evaporate completely in centrifugal evaporator or under a nitrogen flush with fume extraction overnight.

Day 3

Add 500 µl of propan-2-ol, mix, and evaporate.

Repeat

Resuspend the samples and standards in 200 µl of dH$_2$O. Mix well.

Centrifuge and transfer the supernatant into a new tube.

Filter supernatant through 0.45 µm PTFE filters prior to HPLC analysis.

(ii)(b) Analysis of Matrix Polysaccharides—Sulphuric Acid Hydrolysis

Materials

Sulphuric acid 72% (w/v) (AR)

Barium hydroxide (150 mM)

Bromophenol blue (1% solution in water)

Take 300 µl into a new tube, add 1 µl of 1% bromophenol blue. Partially neutralise by the addition of 0.8 ml 150 mM barium hydroxide. Finish by adding barium carbonate powder. The indicator goes blue.

Centrifuge to eliminate the precipitated barium sulphate (10 min at 10000×g). Transfer supernatant to a new tube. Freeze thaw to finish precipitation and repeat centrifugation (total volume 1050 µl).

Prior to HPLC, the samples (700 µl aliquot) are passed on a reverse phase column (e.g. strata X 30 mg) and filtered through a 0.45 µm filter.

The results of these analyses, with respect to xylose content and glucose content are shown in Table 1 below. Quantitative data can be obtained by injection of a known amount of a reference monosaccharide, for example glucose or xylose, as is routine in the art, as well as comparative materials such as those disclosed in WO2014017911 (Examples CelluComp 8 to 10).

TABLE 1

| Sample | Material | Process | Sample taken for TFA hydrolysis (mg) | Peak area | xylose (mg) | % xylose release |
| --- | --- | --- | --- | --- | --- | --- |
| Cellucomp 1 | Sugar Beet | Start Material | 4.8 | 30274 | 0.955 | 19.90 |
| Cellucomp 2 | Sugar Beet | Peroxide Process | 5.7 | 2880 | 0.089 | 1.56 |
| Cellucomp 3 | Sugar Beet | Full Process | 5.1 | 3281 | 0.102 | 2.00 |
| Cellucomp 4 | Sugar Beet | Full Process with extra wash | 5.4 | 3161 | 0.098 | 1.82 |
| Cellucomp 5 | Carrot | Start Material | 5.4 | 3230 | 0.100 | 1.86 |
| Cellucomp 6 | Carrot | Peroxide Process | 4.9 | 1334 | 0.040 | 0.82 |
| Cellucomp 7 | Carrot | Full Process | 4.7 | 1530 | 0.046 | 0.99 |
| Cellucomp 8 | Comparative Example (Carrot) | NaOH + heat | 5.6 | 1021 | 0.030 | 0.54 |
| Cellucomp 9 | Comparative Example (Carrot) | Cellucomp 8 followed by bleach | 4.6 | 1302 | 0.039 | 0.85 |
| Cellucomp 10 | Sugar Beet (low viscosity) | Full process | 4.9 | 1119.3 | 0.033 | 0.68 |

| Sample | Material | Process | Sample taken for H2SO4 hydrolysis (mg) | Peak area | glucose (mg) | % glucose release |
| --- | --- | --- | --- | --- | --- | --- |
| Cellucomp 1 | Sugar Beet | Start Material | 4.8 | 351 | 0.353 | 7.31 |
| Cellucomp 2 | Sugar Beet | Peroxide Process | 5.7 | 1121 | 0.739 | 12.99 |
| Cellucomp 3 | Sugar Beet | Full Process | 5.1 | 1830 | 1.098 | 21.57 |
| Cellucomp 4 | Sugar Beet | Full Process with extra wash | 5.4 | 1654 | 1.012 | 18.71 |
| Cellucomp 5 | Carrot | Start Material | 5.4 | 858 | 0.605 | 11.26 |
| Cellucomp 6 | Carrot | Peroxide Process | 4.9 | 1525 | 0.948 | 19.29 |
| Cellucomp 7 | Carrot | Full Process | 4.7 | 1724 | 1.044 | 22.26 |
| Cellucomp 8 | Comparative Example (Carrot) | NaOH + heat | 5.6 | 3578 | 1.987 | 35.43 |
| Cellucomp 9 | Comparative Example (Carrot) | Cellucomp 8 followed by bleach | 4.6 | 2595 | 1.489 | 32.33 |
| Cellucomp 10 | Sugar Beet (low viscosity) | Full process | 4.9 | 2247 | 1.311 | 26.76 |

0.45 µm filters

SPE reverse phase (styrene divinylbenzene); e.g. Strata-X 30 mg, 1 ml volume.

Method

Weight accurately 4 mg of the alcohol insoluble fraction from step (i) into a 2.0 ml screw-top microcentrifuge tube. Alternatively use the dried residue from the matrix sugar digestion.

Add 70 µl of 72% (w/v) sulphuric acid to the screw-top vial. Mix, until solids are dispersed/dissolved.

Incubate in a water bath at 30° C. for 2 hours. Mix samples every 15 minutes.

Add water to reduce the sulphuric acid concentration to 4.6% (w/w)—add 1530 µl water.

Mix well and heat in a block heater at 121° C. for 4 hours. Vortex every 30 minutes.

Cool to room temperature. (Samples may be stored in fridge for up to 2 weeks at this point).

Example 5

Preparation of Drilling Muds

Method

A particulate composition according to the invention was used at 4.7% solids content (further referred to as "Curran" in Table 2). Additional materials comprised sodium carboxy methyl cellulose (CMC, at a M$_w$ of 250.000), Xanthan gum (XG) and Wyoming Bentonite. Formulations as listed in Table 2 were then prepared by adding to the suspension with 4.7% by weight solid either sodium carboxy methyl cellulose (CMC) or xanthan gum in powder form. These were slowly added, mixed by a stirrer for three hours and completely dissolved in each of the suspension. Then bentonite was added in powder form and stirred for another 30 minutes. Distilled water was used in suspensions. No further pH adjustment was done.

TABLE 2

Dispersions with 3% by weight of Wyoming Bentonite

| Sample | Dynamic Filtration T = 85° F. | Dynamic Filtration T = 150° F. | Dynamic Filtration T = 300° F. | Rheology |
|---|---|---|---|---|
| 0.0% Curran + 0.0% CMC | Done | N/A | N/A | Done |
| 0.5% Curran + 0.0% CMC | Done | N/A | N/A | Done |
| 1.0% Curran + 0.0% CMC | Done | N/A | N/A | Done |
| 0.0% Curran + 0.25% CMC | Done | Done | N/A | Done |
| 0.5% Curran + 0.25% CMC | Done | Done | N/A | Done |
| 0.25% Curran + 0.125% CMC | Done | Done | Done | Done |
| 0.50% Curran + 0.25% Xanthan Gum | Done | Done | Done | Done |

From the above examples, it can be seen that the cellulose particulate materials described herein, and the processes for producing such cellulose particulate materials find utility in many different applications.

Dynamic Filtration Measurements

A High pressure, high temperature Fann® Model 90 Dynamic Filtration System (DFS) was used to measure the fluid loss and filter cake formation characteristics of formulations. The Fann® Model 90 is a computerized instrument for conducting filter cake formation, fluid loss and permeability analysis, utilizing a selection of available porous filter core media, and performs experiments with a porosity that closely resembles the formation of interest.

The DFS tests simulates the down hole conditions of pressure, temperature and cross flow of drilling muds. Test parameters of pressure, pressure differential, shear rate and temperature are used to stimulate drilling conditions. Herein, a filter was used that exhibited a mean pore diameter of 35 μm and an air permeability according to Darcy of 5.5, listed as part number 213483.

Rheological measurements, steady state shear viscosity vs. shear-rate measurements of NCC suspensions were carried out on a TA Instruments AR-G2 Rheometer (New Castle, Del.) equipped with a 20 cone and plate geometry of 60 mm in diameter. The torque resolution was 0.11 μN.

Dynamic Filtration Measurements

As a simulation of fluid loss of the drilling fluid compositions in field tests, the Fann® Model 90 Dynamic Filtration System was employed to evaluate the use of the particulate matter in bentonite based drilling formulations. This method is often used by the drilling fluids industry to evaluate the performances of drilling fluids.

Figure 3:
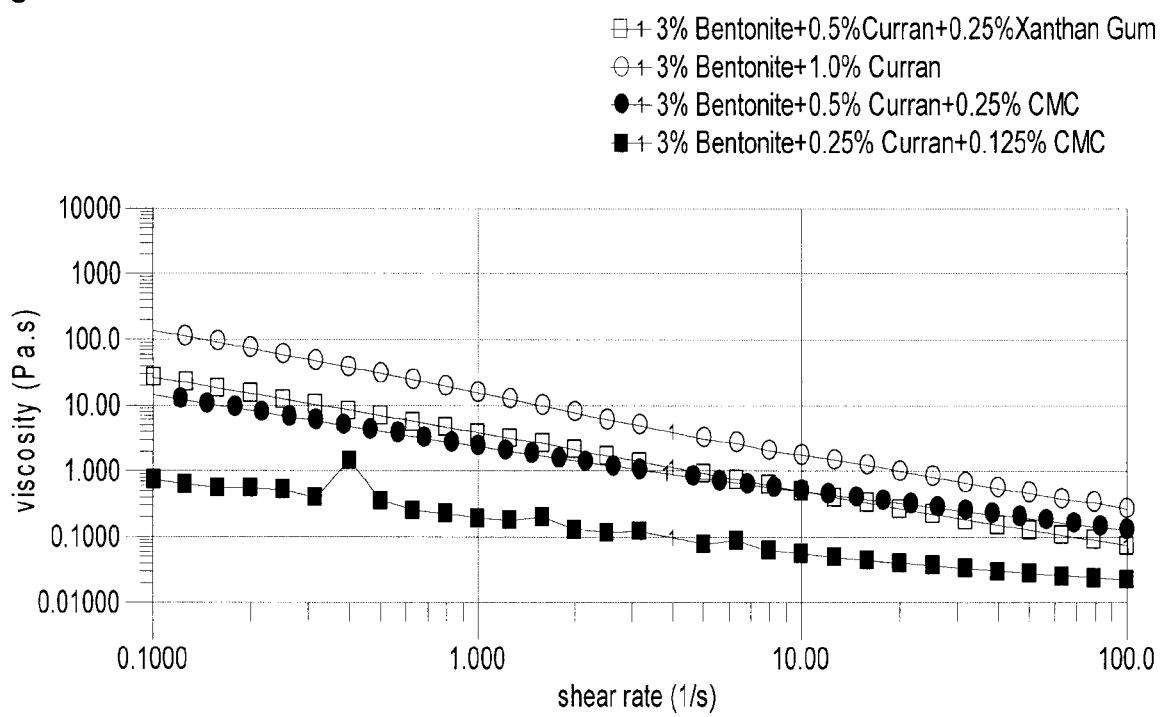
Figure 4:
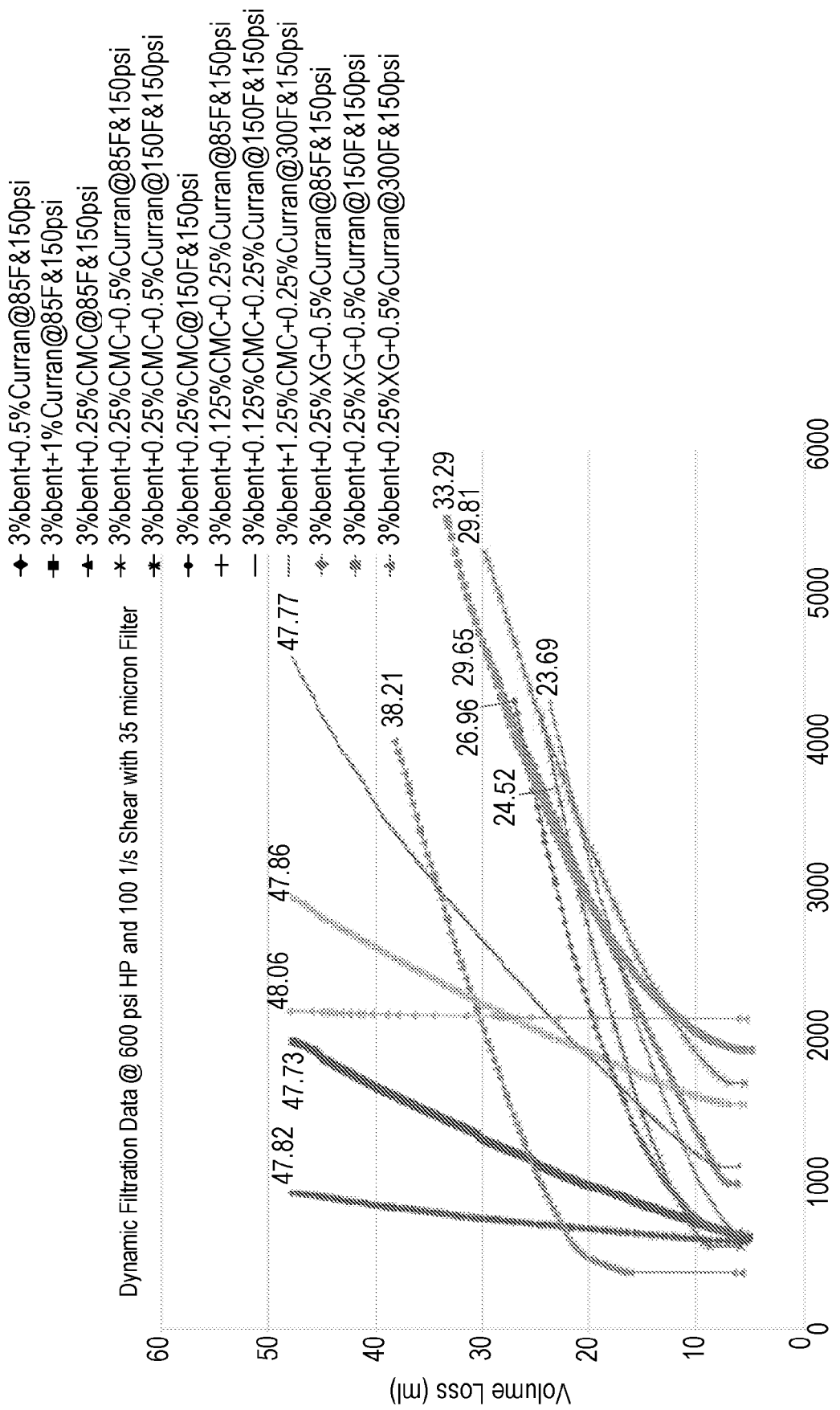
FIG. 4 shows the total volume of drilling mud samples with collected from the DFS tests.

The porous Filter Core medium is a thick walled cylinder with formation like characteristics to simulate the depositing and build-up of cake on the formation. The porosity and permeability simulates the fluid loss to the formation. The differential pressure is between the sample in the Cell and the outside of the Filter Core (the outside diameter). The differential is induced by reducing the pressure above the Filtrate Piston in the Collector, to a pressure less than the Cell pressure. The fluid loss rate is tracked as well as the fluid loss volume as shown in FIG. 3 as a function of time. Fluid loss data is also summarized in Table 3. Mud samples which generated better cakes resulted in less fluid loss. Test Conditions were as follows: Static Pressure: 600 psi, Shear Rate: 100 s-1; Pore size: 35 micron; Delta P: 150 psi.

Table 3: Fann 90 Dynamic Filtration Test Results, Drilling Fluid Compositions: (3% Bentonite+y % Polymer+x % Curran®)

| Temperature (° F.) | Curran (%) | No Polymer | | CMC 0.125% | CMC 0.25% | Xanthan Gum 0.25% |
|---|---|---|---|---|---|---|
| | | 0.0 | 0.50 1.0 | 0.25 | 0.0 0.50 | 0.50 |
| 85 | Vol. Loss (ml) | 49.00 | 48.82 47.73 | 23.69 | 38.21 24.52 | 29.96 |
| 150 | Vol. Loss (ml) | | | 47.77 | 26.95 29.81 | 33.29 |
| 300 | Vol. Loss (ml) | | | 47.86 | | 48.06 |

Figure 2:
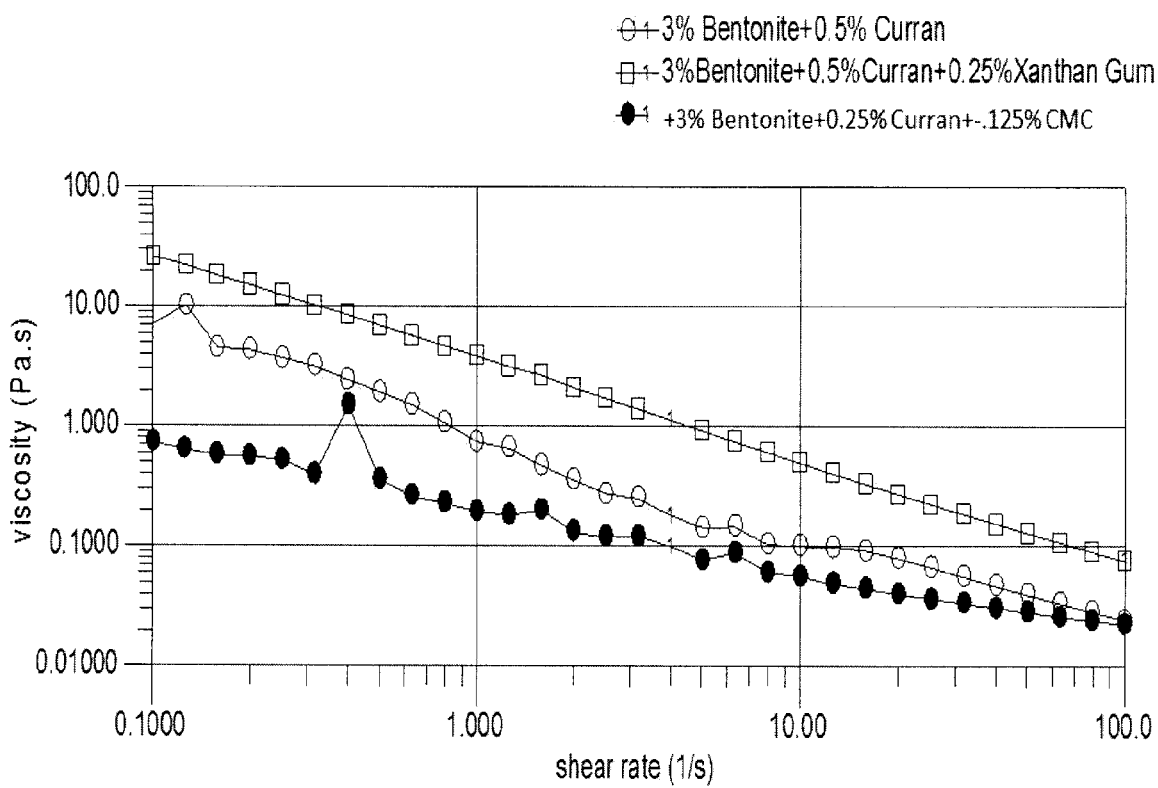
FIG. 2 shows the comparison of thickening effects of 0.5% Curran with x % Curran+y % Polymer formulations in 3% bentonite suspension at 20° C.

As shown in FIGS. 1, 2 and 3, Curran is not only a good thickener in bentonite suspensions, but also enhances synergistically the non-Newtonian character of CMC and Xanthan Gum formulated bentonite suspensions.

Example 6

The effect of CMC and materials according to the invention on viscosity was tested. A finished cellulosic particle paste comprising of from 25-27% wt. solids was grated on a cheese grater to give small particles which could be conveniently stored.

The particles were then used to make pre-gels with water i.e. mixed with water to rehydrate them back to pastes. One sample was the material only, with 1 wt. % solids. The second sample was the same material with CMC with total solids at 1% (0.9% Curran, 0.1% CMC). Both pre-gels were placed in separate beakers and their viscosity measured (using a Brookfield Viscometer) over a range of different rpm of the brookfield spindles. Table 4 shows the resulting viscosities:

TABLE 4

Viscosity of Curran, CMC, and Curran plus CMC, all in cps

| rpm | 1% Curran in water | 0.1% CMC in water | 0.5% CMC in water | 0.9% Curran and 0.1% CMC in water |
|---|---|---|---|---|
| 100 | 666 | 27.2 | 79.6 | 1136 |
| 50 | 1032 | 20.8 | 62.4 | 1952 |

TABLE 4-continued

Viscosity of Curran, CMC, and Curran plus CMC, all in cps

| rpm | 1% Curran in water | 0.1% CMC in water | 0.5% CMC in water | 0.9% Curran and 0.1% CMC in water |
|---|---|---|---|---|
| 20 | 1885 | 14 | 42 | 4050 |
| 10 | 2950 | 12 | 40 | 6880 |

The experiment was repeated with Xanthan gum and the same material. However, this was re-hydrated with water by mixing on a Dispermat at 10 m/s for 30 min. One batch was the material alone at 1% solids. The other batch was the material and xanthan powder mixed into it and made up to a total of 1 wt. % solids solids (0.1 xanthan, 0.9 cellulose containing material denoted herein as Curran). The mixture or pre-gels were then placed under a Brookfield viscometer and the viscosities measured at a range of different rpm, at 20° C. Table 5 shows the results:

TABLE 5

Viscosity of Curran, Xanthan, and Curran combined with Xanthan, all in cps

| rpm | Curran 1% no Xanthan | 0.1% xanthan | 0.9% Curran 0.1% xanthan |
|---|---|---|---|
| 100 | 791 | 42.4 | 804 |
| 50 | 1260 | 45.6 | 1480 |
| 20 | 2510 | 64 | 3500 |
| 10 | 4130 | 92 | 6620 |

The results clearly indicate that the compositions according to the invention have a synergetically higher viscosity than either of the components separately.

The invention claimed is:

1. A composition comprising a plant-derived cellulose particulate material derived from a starting herbaceous plant material and comprising:
   less than 30 wt % extractable glucose and
   extractable xylose in an amount of 0.5 to 2.0 wt %; and
   an agent selected from the group consisting of natural ionic polymers or natural non-ionic polymers, synthetic water dispersible polymers, and associative thickeners.

2. The composition according to claim 1, wherein the plant-derived cellulose particulate material comprises less than 60 wt % cellulose.

3. The composition according to claim 1, wherein the particles have a mean major dimension of from 1 to 250 μm and a water-holding capacity in the range of 90 to 99.5% by weight.

4. The composition according to claim 1, wherein the plant-derived cellulose particulate material has a non-carbohydrate content of 20 to 50% by dry weight.

5. The composition according to claim 1, wherein the composition comprises less than 10 wt % plant-derived cellulose particulate material.

6. The composition according to claim 1, wherein the natural ionic polymers or natural non-ionic polymers comprise carboxymethyl cellulose (CMC), Xanthan Gum, Guar gum, alginate, or any combination thereof.

7. The composition according to claim 1, wherein the synthetic water dispersible polymers comprises a high molecular weight water based polymer dispersion.

8. The composition according to claim 1, wherein the associative thickener comprises a hydrophobically modified alkali swellable emulsion, and/or a hydrophobically modified ethoxylated urethane, wherein a synthetic acrylic water dispersible resin is present.

9. The composition according to claim 1, further comprising a polymeric dispersant providing a strong charge to the particles, or provides steric hindrance.

10. The composition according to claim 1, further comprising a clay material.

11. The composition according to claim 1, comprising less than about 5 wt of the plant-derived cellulose particulate material.

12. The composition according to claim 11, further comprising an alkylated cellulose, an aggregate clay material, and less than about 10 wt % plant-derived cellulose particulate material.

13. A process for preparing a composition according to claim 1, the process comprising:
   (i) contacting herbaceous plant material comprising greater than 30% by volume of parenchymal cell material and less than 10 wt % lignocelluloses with a peroxide reagent and water;
   (ii) heating the mixture from (i) to a temperature of from 30 to 110° C. and maintaining said mixture at a temperature of from 30 to 110° C. until the pH of the mixture has dropped by at least 2 pH units;
   (iii) isolating the cellulose-containing particles; and
   (iv) contacting the mixture obtained in (ii) or the cellulose-containing particles obtained in (iii) with an agent selected from the group consisting of natural ionic polymers or natural non-ionic polymers; synthetic water dispersible polymers, and/or associative thickeners, or a combination thereof;
   wherein the process is carried out in the absence of an alkali or acid reagent and a transition metal.

14. The process according to claim 13, wherein the plant material comprises carrot, sugar beet and/or potato.

15. The process according to claim 13, wherein step (i) includes mechanically treating the vegetable material so that it comprises particles with a major dimension of less than 10 mm.

16. The process according to claim 13, wherein step (ii) involves mechanically homogenizing the mixture while the mixture is being maintained at said temperature, and/or wherein step (ii) involves cooling down the mixture after the period of time is over and then mechanically homogenizing the mixture.

17. The process according to claim 13, wherein, in step (ii) the mixture is heated to a temperature of from 70 and 100° C. and maintained at a temperature of from 70 and 100° C.

18. The process according to claim 13, further comprising a step of reducing the water content of the product of step (iii).

19. The process according to claim 13, wherein the peroxide reagent comprises hydrogen peroxide, an organic peroxide or an inorganic peroxide.

20. The process according to claim 13, wherein the process is carried out in the absence of an alkali or acid reagent.

* * * * *